July 21, 1925.
E. VANDERSTEIN
CUPOLA FURNACE
Filed Feb. 5. 1924
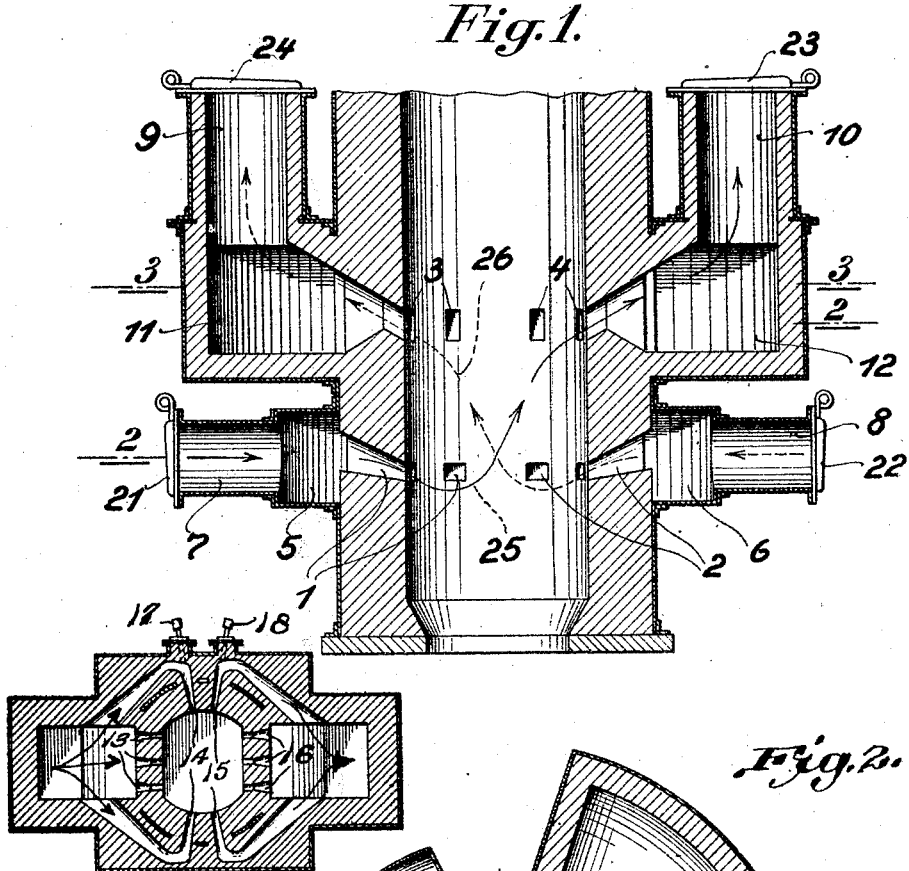
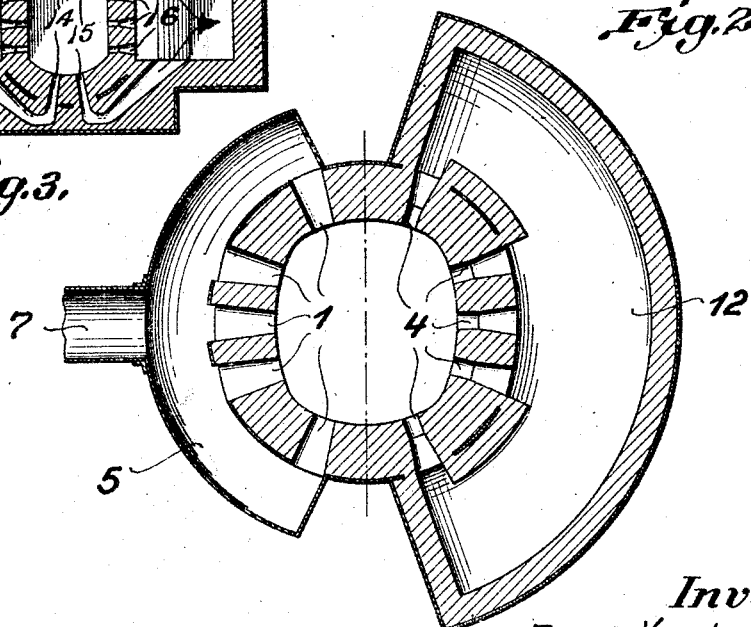
Inventor
Ewald Vanderstein Patented July 21, 1925.

1,546,521

UNITED STATES PATENT OFFICE.

EWALD VANDERSTEIN, OF DULKEN, GERMANY.

CUPOLA FURNACE.

Application filed February 5, 1924. Serial No. 690,723.

*To all whom it may concern:*

Be it known that I, EWALD VANDERSTEIN, a citizen of the German Republic, and residing at Dulken, Germany, have invented certain new and useful Improvements in Cupola Furnaces, of which the following is a specification.

My invention relates to improvements in cupola furnaces and in the method of operating the same, and more particularly in the air supplying system. The object of the improvements is to provide a system by means of which uniform combustion of the fuel all over the cross-section of the melting zone is insured, and the efficiency of the furnace is increased and hot iron is produced. With this object in view my invention consists in distributing the air supplying tuyères and the suction passages for removing the gases of combustion all around the furnace and so that the hot or cold air passes through the whole cross-section of the furnace. In the preferred construction the tuyères and discharge passages are disposed in different heights, the discharge passages being located at a higher level than the admission passages. I have found that by thus providing a melting zone of increased height, the efficiency of the air is further improved, the air being forced to flow upwardly from the tuyères and through the mass of fuel. In the construction of the furnace I provide two sets of tuyères disposed at the same level and opposite to each other and, above the said sets, two sets of outlet passages disposed opposite to each other. Means are provided for reversing the direction of the movement of the air. I wish it to be understood that I do not limit myself to a construction in which the inlet and outlet passages are at different levels.

For the purpose of explaining the invention two examples embodying the same have been shown in the accompanying drawings in which the same reference characters have been used in all the views to indicate corresponding parts. In said drawings, Fig. 1, is a sectional elevation of the bottom part of the furnace, and Fig. 2, is a horizontal section taken on the line 2—2 of Fig. 1, and Fig. 3, is a horizontal cross-section taken on the line 3—3 of Fig. 1 and showing a modification.

In the example shown in Figs. 1 and 2 the shaft 20 of the cupola furnace is provided with two sets 1 and 2 of air admission tuyères located within the same plane and opposite to each other, and with two sets 3 and 4 of outlet passages located above the inlet passages within the same plane and opposite to each other. The passages of the sets are so distributed around the circumference of the furnace that the incoming air fills out the whole cross-section of the melting chamber of the furnace. The sets 1 and 2 of inlet passages are connected with air distributing chambers 5 and 6 connected by conduits 7 and 8 with regenerators or air compressors, and the outlet passages 3 and 4 are connected with return conduits or other conduits 9 and 10 and collecting chambers 11 and 12.

The sets of inlet and outlet passages are provided with valves or gates 21, 22, 23 and 24 for regulating the supply and discharge of the air. In the operation of the furnace I set the valves so that when admitting the air through the set 1 of inlet passages the gases of combustion are discharged through the set 4 of suction passages which are located diametrically opposite thereto, while the passages 2 and 3 are out of operation. After a certain period of time the valves 21 and 23 are closed and the valves 22 and 24 opened, so that the air flows from the set 2 of inlet passages to the set 3 of outlet passages, the sets 1 and 4 being out of operation. The path of the air is indicated in Fig. 1 by arrows 25 and 26, shown respectively in full and dotted lines, and it will be understood that the air follows either the arrow 25 shown in a full line or the arrow 26 shown in a dotted line. In some cases each set of inlet and outlet passages comprises a plurality of passages placed one above the other. If it is desired to cause a more intense combustion I open all the passages and force air through both sets of inlet passages so that the currents of air cross each other and bound against each other and cause whirls and intimate mixture of the air. This mode of operation is particularly preferred when supplying cold air or partly cold and partly hot air, and when it is necessary to add oil, coal dust, gas, and other matter for influencing the composition of the iron or reducing the consumption of coke.

In the modification shown in Fig. 3 all the air admission and discharge passages are in the same plane. The passages are so distributed around the circumference of the melting chamber that the air passes through the same from all sides. The admission passages have been indicated by the numerals 13 and 14 and the discharge passages by the numerals 15 and 16. After a certain period of time the direction of the flow of the air is reversed, the air being admitted through the passages 15 and 16 and discharged through the passages 13 and 14. Also in this construction in some cases a plurality of nozzles of the same set are disposed one above the other, and the same or different numbers of passages are provided in the superposed series. Axially of the passages 14 and 15 there are peep holes 17 and 18 for observing the operation of the furnace.

In the example described with reference to Figs. 1 and 2 the discharge passages are disposed a certain distance below the top of the furnace; but I do not limit myself to this feature. In some cases I dispose the discharge passages close to the top of the furnace and I force the combustion gases to flow through the said passages by closing the furnace at its top.

I claim:

1. In a cupola furnace of the type set forth, in combination with the shaft, a set of blast inlet passages, and a set of outlet passages for the combustion gases, the said sets arranged oppositely to each other in the same horizontal zone and each set confined to one-half of the shaft circumference.

2. In a cupola furnace of the type set forth, in combination with the shaft, a set of inlet passages and a set of outlet passages arranged oppositely to each other, the said inlet passages located at a different level than the said outlet passages, and each set confined to one-half of the shaft circumference.

3. In a cupola furnace of the type set forth, in combination with the shaft, a set of inlet passages and a set of outlet passages arranged oppositely to each other and each set confined to one-half of the shaft circumference, a conduit chamber for each set common to all passages in the respective set, and means for controlling the passage of the gases through the several sets.

4. In a cupola furnace of the type set forth, in combination with the shaft, two sets of inlet passages annularly arranged around the shaft and each set extending over substantially one-half of the annulus, a conduit chamber in communication with all inlet passages in each set; two sets of outlet passages arranged in substantially similar annular disposition about the shaft and at a different level from said inlet passages, and a conduit chamber in communication with all outlet passages in each set, and means for controlling the passage of gases through said inlet and outlet passages.

5. In a cupola furnace of the type set forth, in combination with the shaft, two sets of inlet passages in annular arrangement and each set extending over substantially one-half of the annulus, a conduit chamber in communication with all inlet passages in each set; two sets of outlet passages in annular arrangement above said inlet sets and each set likewise extending over substantially one-half of the annulus, a conduit chamber in communication with all inlet passages in each outlet set, and means for communicatingly connecting and disconnecting diametrically opposed sets of inlet and outlet passages and their respective conduit chambers.

6. The described method for operating a cupola furnace, which consists in causing the gases to alternately pass in opposite directions through sets of inlet and outlet passages located diametrically opposite to each other.

7. The described method of operating a cupola furnace, which consists in causing the gases to alternately pass upwardly and in cross-currents through sets of inlet and outlet passages located diametrically opposite to each other at respectively different levels.

8. In a cupola furnace of the type set forth, in combination with the shaft, a set of inlet passages and a set of outlet passages, each set comprising a series of spacedly superimposed tiers of interconnected passages, and means for controlling the passage of the gases through the said sets.

9. In a cupola furnace of the type set forth, in combination with the shaft, a set of inlet passages and a set of outlet passages, each set comprising a series of semiannular, spacedly superimposed tiers of intercommunicating passages, said sets being disposed opposite to each other, and means for controlling the flow of the gases through said sets.

In testimony whereof I affix my signature.

EWALD VANDERSTEIN.